(12) United States Patent
Stöcklein et al.

(10) Patent No.: US 8,005,330 B2
(45) Date of Patent: Aug. 23, 2011

(54) OPTICAL TRANSMISSION ELEMENT AND METHOD FOR PRODUCING AN OPTICAL TRANSMISSION ELEMENT

(75) Inventors: Waldemar Stöcklein, Coburg (DE); Dieter Kundis, Lautertal (DE)

(73) Assignee: CCS Technology, Inc., Wilmington, DE (US)

(*) Notice: Subject to any disclaimer, the term of this patent is extended or adjusted under 35 U.S.C. 154(b) by 276 days.

(21) Appl. No.: 11/990,678

(22) PCT Filed: Aug. 17, 2006

(86) PCT No.: PCT/DE2006/001444
§ 371 (c)(1),
(2), (4) Date: Jul. 31, 2009

(87) PCT Pub. No.: WO2007/019844
PCT Pub. Date: Feb. 22, 2007

(65) Prior Publication Data
US 2009/0297110 A1     Dec. 3, 2009

(30) Foreign Application Priority Data
Aug. 18, 2005   (DE) .......................... 10 2005 039 482

(51) Int. Cl.
*G02B 6/44* (2006.01)
(52) U.S. Cl. ........................................ 385/111; 439/577
(58) Field of Classification Search .................. None
See application file for complete search history.

(56) References Cited

U.S. PATENT DOCUMENTS

| | | | | |
|---|---|---|---|---|
| 4,776,665 A | * | 10/1988 | Oestreich | 385/102 |
| 4,952,021 A | | 8/1990 | Aoki et al. | 350/96.23 |
| 5,557,703 A | | 9/1996 | Barker et al. | 385/128 |
| 6,650,815 B2 | * | 11/2003 | Hawtof et al. | 385/128 |
| 2003/0026568 A1 | * | 2/2003 | Hawtof et al. | 385/128 |

FOREIGN PATENT DOCUMENTS

| | | |
|---|---|---|
| DE | 2162976 | 12/1971 |
| DE | 19882152 T1 | 3/1998 |
| EP | 0096123 B1 | 6/1982 |
| EP | 0752604 B1 | 7/1996 |
| WO | WO03/083515 A2 | 10/2003 |
| WO | WO004/015465 A2 | 2/2004 |
| WO | WO2004/114489 A1 | 12/2004 |

* cited by examiner

*Primary Examiner* — Charlie Peng
*Assistant Examiner* — Mary El Shammaa
(74) *Attorney, Agent, or Firm* — C. Keith Montgomery

(57) ABSTRACT

An optical transmission element comprises optical waveguides embedded into a UV-curing protective layer. The optical waveguides and the UV-curing protective layer are surrounded by a sheath, on which spherical elements are arranged. A conductive layer is applied on the sheath and the spherical elements arranged thereon, said conductive layer having a resistivity. of an order of magnitude of $5 \cdot 10^{10}$ ohms per meter measured at a temperature of between 18 degrees Celsius and 24 degrees Celsius and a relative humidity of 45 percent. In the case of an optical transmission element of this type, electrostatic charging when the optical transmission element is blown into an empty conduit is avoided to the greatest possible extent, such that possible blowing-in lengths within a range of between 500 meters and 1000 meters are obtained.

22 Claims, 2 Drawing Sheets

OPTICAL TRANSMISSION ELEMENT AND METHOD FOR PRODUCING AN OPTICAL TRANSMISSION ELEMENT

FIELD OF THE INVENTION

Optical transmission element and method for producing an optical transmission element The invention relates to an optical transmission element and to a method for producing an optical transmission element, wherein the optical transmission element is preferably used for blowing into an empty conduit.

BACKGROUND OF THE INVENTION

FIG. 1 shows an optical transmission element 10 containing four optical waveguides 1a, 1b, 1c and 1d in its interior. The optical waveguides are embedded into a protective layer 2. The protective layer 2 contains a UV-curing acrylate, for example. The protective layer 2 is surrounded by an outer sheath 3.

In order to protect optical transmission elements against tensile and compressive loading and also in order to afford protection against contamination, optical transmission elements are guided in empty conduits. The optical transmission elements are blown into the empty conduits by compressed air. The empty conduits are formed as plastic conduits having an outer diameter of approximately 5 millimeters and an inner diameter of approximately 3.5 millimeters.

The length with which an optical transmission element can be blown into an empty conduit is a significant quality feature. Typical blow-in lengths are between 500 meters and 1000 meters, which have to be achieved under different climatic conditions. In order to reduce a frictional resistance when an optical transmission element is blown into an empty conduit, the empty conduit generally has an inner coating affording slidability.

The document U.S. Pat. No. 5,557,703 describes an embodiment of an optical transmission element which is used for blowing into an empty conduit. In order to improve the blow-in behavior and in particular in order to reduce a friction between the optical transmission element and the inner wall of the empty conduit, spherical elements are disposed on a surface of the outer sheath of the optical transmission element. In this case, the coefficient of friction of the spherical elements is preferably lower than the coefficient of friction of the material used for the inner wall of the empty conduit.

FIG. 2 shows the outer sheath 3 of an optical transmission element with spherical elements applied on said sheath.

Despite such measures, a friction process between the outer sheath of the optical transmission element and the inner wall of the empty conduit cannot be avoided when an optical transmission element is blown into an empty conduit. Possible blowing-in lengths within the range of between 500 meters and 1000 meters as specified above are achieved, however, only when electrostatic charging of the optical elements is avoided by suitable measures during a blow-in operation. When the optical transmission elements are blown in, charging of the optical transmission elements generally occurs as a result of the friction of the optical transmission elements at the inner coating of the empty conduit. The charges on the surface of the optical transmission elements lead to a high degree of adhesion on account of the electrostatic attraction between the optical transmission elements and the inner wall of the empty conduit.

SUMMARY OF THE INVENTION

The object of the present invention is to provide an optical transmission element in which electrostatic charging of the optical transmission element is avoided to the greatest possible extent when the optical transmission element is blown into an empty conduit. A further object of the present invention is to provide a method for producing an optical transmission element in which electrostatic charging of the optical transmission element is avoided to the greatest possible extent when the optical transmission element is blown into an empty conduit.

The object with regard to the optical transmission element is achieved by means of an optical transmission element comprising at least one optical waveguide, comprising a sheath surrounding the at least one optical waveguide, wherein a conductive layer having a resistivity of between $10^9$ ohms per meter and $10^{11}$ ohms per meter is applied on the sheath.

The resistivity of the conductive layer preferably lies within a range of between $10^{11}$ ohms per meter and $5 \cdot 10^9$ ohms per meter, measured at a relative humidity of between 30 percent and 70 percent.

In one embodiment, the resistivity of the conductive layer has a value of approximately $5 \cdot 10^{10}$ ohms per meter, measured at a relative humidity of 45 percent and a temperature of between 18 degrees Celsius and 24 degrees Celsius.

In accordance with one embodiment of the optical transmission element, the conductive layer contains a lauric acid derivative.

In another configuration of the optical transmission element, the sheath has a resistivity which is at least three powers of ten greater than the resistivity of the conductive layer.

In accordance with one development of the optical transmission element, the sheath contains a material composed of plastic. In one preferred embodiment, the sheath contains a urethane acrylate. The sheath can also contain nylon.

In another embodiment of the optical transmission element, a protective layer is arranged between the at least one optical waveguide and the sheath. The protective layer can contain a UV-curing acrylate.

In accordance with a further feature of the optical transmission element, the protective layer has a resistivity which is at least three powers of ten greater than the resistivity of the conductive layer.

One development of the optical transmission element provides for spherical elements surrounded by the conductive layer to be arranged on the sheath. In one preferred embodiment, the spherical elements are formed as spheres composed of glass.

A method for producing an optical transmission element is specified below. According to said method, at least one optical waveguide is to be provided. The at least one optical waveguide is subsequently surrounded with a sheath. This is followed by applying a conductive layer to the sheath, which has a resistivity of between $10^9$ ohms per meter and $10^{11}$ ohms per meter.

In one embodiment of the method, the conductive layer is applied to the sheath by spraying the sheath with a liquid containing a lauric acid derivative. In the method, the concentration of the lauric acid derivative in the liquid is chosen in such a way that the resistivity of the conductive layer, measured at a relative humidity of 45 percent and a temperature of between 18 degrees Celsius and 24 degrees Celsius, after a drying of the conductive layer, has a value of approximately $5 \cdot 10^{10}$ ohms per meter.

In accordance with one embodiment of the method, a liquid, for example a solution, is used which contains an alcohol. Isopropanol can be used as the alcoholic portion of the solution.

One development of the method provides for the at least one optical waveguide to be embedded into a protective layer before the step of surrounding the at least one optical waveguide with the sheath. The protective layer is subsequently cured by heating the protective layer.

One development of the method provides for spherical elements to be arranged on the sheath before the step of applying the conductive layer. Subsequently, the conductive layer is applied to the sheath and the spherical elements.

The sheath is preferably cured by heating the sheath.

According to a further method feature, the method step of applying the conductive layer is effected as long as the sheath is in a heated state owing to the step of curing the sheath. After applying the conductive layer, the conductive layer, which is still initially present in a liquid state, is dried out.

The optical transmission element according to the invention can preferably be used for blowing into an empty conduit. Instances of charging of the surface of the optical transmission element which otherwise arise when the optical transmission element is blown into an empty conduit on account of the friction between the surface of the optical transmission element and the inner coating of the empty conduit can be avoided to the greatest possible extent as a result of the antistatic effect of the conductive layer. The adhesion of the optical transmission element at the inner wall of the empty conduit is thereby reduced during a blow-in operation, whereby the blow-in behavior is improved. In particular, the possible blowing-in length into an empty conduit can be increased when an optical transmission element of this type is used.

The invention is explained in more detail below with reference to figures showing exemplary embodiments of the present invention.

DETAILED DESCRIPTION OF THE INVENTION

Figure 1:
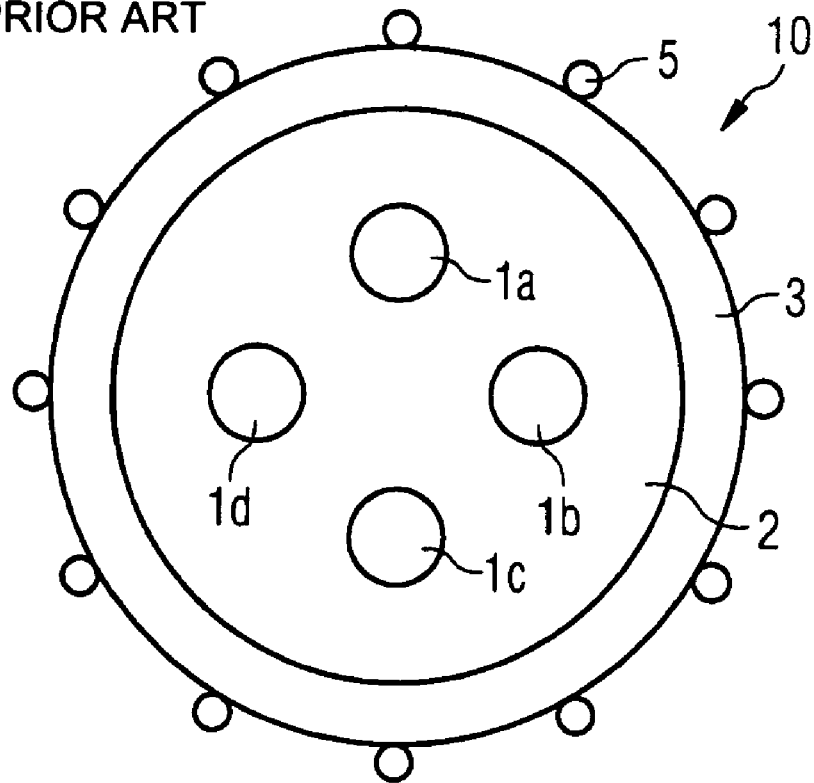
FIG. 1 shows a conventional optical transmission element for blowing into an empty conduit.
Figure 2:
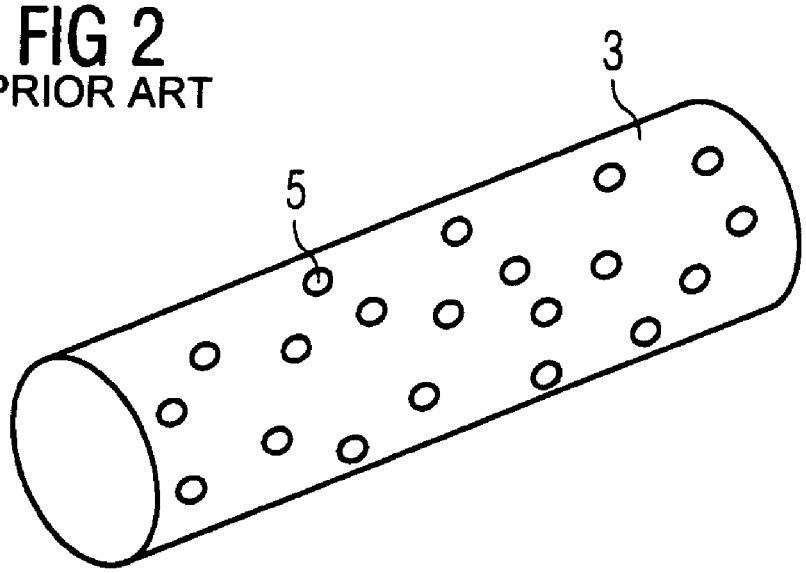
FIG. 2 shows a surface of an outer sheath of the conventional optical transmission element of FIG. 1 for blowing into an empty conduit.
Figure 3:
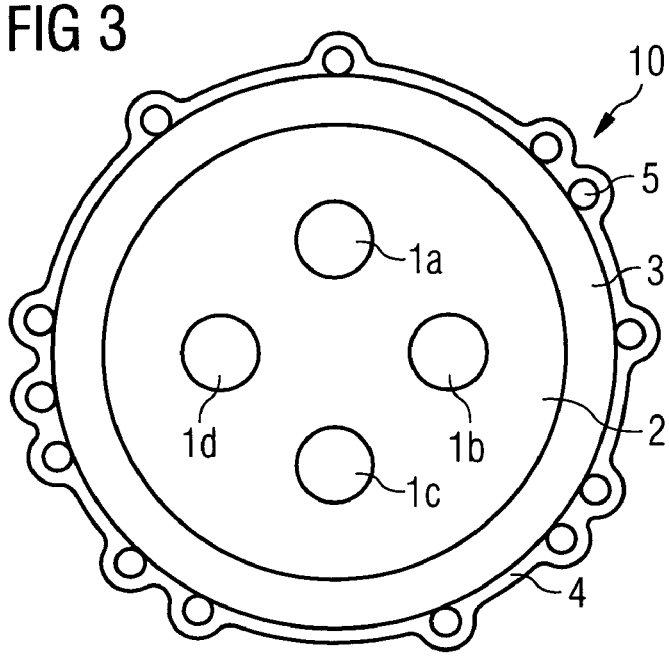
FIG. 3 shows an optical transmission element for blowing into an empty conduit according to the present invention.

FIG. 3 shows an optical transmission element having a plurality of optical waveguides $1a$, $1b$, $1c$ and $1d$ in its interior. The optical waveguides are embedded into a protective layer, for example a UV-curing acrylate. The optical waveguides and the protective layer are surrounded by an outer sheath 3. The outer sheath 3 can have an acrylate, such as urethane acrylate, for example. It can also be formed from nylon.

In order to reduce a frictional resistance, spherical elements 5 are arranged on the sheath 3, said spherical elements having a low coefficient of friction in comparison with a material of the inner coating of an empty conduit. The spherical elements are for example spheres composed of glass. According to the invention, a further layer 4 is applied to the sheath 3 and over the spherical elements. The further layer 4 is formed as a conductive layer, which therefore has an antistatic effect.

A method for producing the optical transmission element according to the invention is specified below. The optical waveguides $1a$, $1b$, $1c$ and $1d$ are embedded into a protective layer 2 composed of a UV-curing acrylate in a production line. The protective layer 2 is subsequently dried out. Afterward, a sheath 3, which likewise contains a material composed of a UV-curing acrylate, is extruded around the optical waveguides $1a$, $1b$, $1c$ and $1d$ and the protective layer 2. The sheath 3 is then in a wet and highly viscous state. In this state, the arrangement subsequently passes through a chamber in which the sheath 3 is equipped with spherical elements 5. The sheath 3 is subsequently cured by irradiation with UV light. By virtue of the UV radiation, the sheath 3 is crosslinked and absorbs heat in the process, whereby the sheath is heated. In the still heated state of the sheath, the conductive layer 4 is applied to the sheath 3 and over the spherical elements 5.

For this purpose, a solution, preferably containing a lauric acid derivative, is sprayed onto the sheath 3 and the spherical elements 5 via spraying nozzles arranged circumferentially around the sheath 3. The lauric acid derivative is dissolved in a solvent, which is preferably alcoholic. Isopropanol, for example, can be used as the solvent. The use of an alcoholic solvent ensures that the solution comprising the lauric acid derivative is distributed uniformly on the sheath 3 and the spherical elements 5 on account of the low surface tension of the alcohol. The liquid sprayed on dries out rapidly as a result of the increased temperature of the sheath 3. The alcohol evaporates in the process. After the drying-out process, the sheath 3 and the spherical elements, as shown in FIG. 3, are coated by the conductive layer 4. The optical transmission element is subsequently wound onto a drum.

Figure 4:
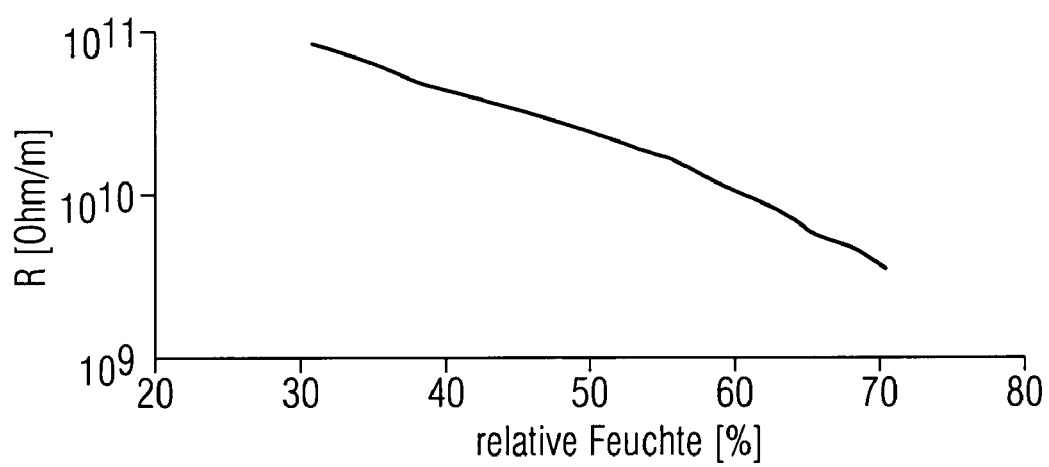
FIG. 4 shows the profile of a resistivity of a conductive outer layer of an optical transmission element plotted against a relative humidity according to the concepts of the present invention.

FIG. 4 shows a resistivity of the conductive layer 4 plotted as a function of a relative humidity. The resistivity of the conductive layer, measured at a relative humidity of between 30 percent and 70 percent, lies within a range of $10^{11}$ ohms per meter and $5 \cdot 10^9$ ohms per meter. When a solution comprising a lauric acid derivative is used, the resistivity of the conductive layer can be varied by the concentration of the lauric acid derivative in the solution. A conductive layer having a surface resistivity having a value of $5 \cdot 10^{10}$ ohms per meter measured at a room temperature of between 18 degrees Celsius and 24 degrees Celsius and a relative humidity of 45 percent has proved to be particularly. advantageous when using the optical transmission element for preventing electrostatic charging during the process of blowing into an empty conduit. It has been shown that a resistivity of the conductive layer 4 whose fluctuation range is $\pm 0.5 \cdot 10^{10}$ ohms per meter can be achieved by means of the method specified.

The resistivity of the optical transmission element according to the invention can be determined for example by applying a voltage to a section of the optical transmission element having a length of approximately ten centimeters, and measuring the current flowing through the conductive layer in the process.

We claim:

1. An optical transmission element comprising:
   at least one optical waveguide disposed in a protective layer,
   a sheath located adjacent the protective layer and surrounding the at least one optical waveguide, and
   a conductive layer having a resistivity of between $10^9$ ohms per meter and $10^{11}$ ohms per meter applied on the sheath.

2. The optical transmission element of claim 1, wherein the resistivity of the conductive layer measured at a relative humidity of between 30 percent and 70 percent lies within a range of between $10^{11}$ ohms per meter and $5 \cdot 10^9$ ohms per meter.

3. The optical transmission element of claim 1, wherein the resistivity of the conductive layer measured at a relative humidity of 45 percent and a temperature of between 18 degrees Celsius and 24 degrees Celsius has a value of approximately $5 \cdot 10^{10}$ ohms per meter.

4. The optical transmission element of claim 1, wherein the conductive layer contains a lauric acid derivative.

5. The optical transmission element of claim 1, wherein the sheath has a resistivity which is at least three powers of ten greater than the resistivity of the conductive layer.

6. The optical transmission element of claim 1, wherein the sheath contains a material composed of plastic.

7. The optical transmission element of claim 1, wherein the sheath contains nylon.

8. The optical transmission element of claim 1, wherein the sheath contains a urethane acrylate.

9. The optical transmission element of claim 1, wherein the protective layer contains a UV-curing acrylate.

10. The optical transmission element of claim 1, wherein the protective layer has a resistivity which is at least three powers of ten greater than the resistivity of the conductive layer.

11. The optical transmission element of claim 1, wherein spherical elements surrounded by the conductive layer are arranged on the sheath.

12. The optical transmission element of claim 11, wherein the spherical elements are formed as spheres composed of glass.

13. The use of an optical transmission element of claim 1 for blowing into an empty conduit.

14. A method for producing an optical transmission element, comprising :
providing at least one optical waveguide,
disposing the at least one optical waveguide in a protective layer,
subsequently surrounding the protective layer with a sheath, and
subsequently applying a conductive layer to the sheath, which has a resistivity of between $10^9$ ohms per meter and $10^{11}$ ohms per meter.

15. The method of claim 14, comprising applying the conductive layer to the sheath by spraying the sheath with a liquid containing a lauric acid derivative.

16. The method of claim 15, wherein the concentration of the lauric acid derivative in the liquid is chosen in such a way that the resistivity of the conductive layer, measured at a relative humidity of 45 percent and a temperature of between 18 degrees Celsius and 24 degrees Celsius, after a drying of the conductive layer, has a value of approximately $5 \cdot 10^{10}$ ohms per meter.

17. The method of claim 15, wherein the liquid contains an alcohol.

18. The method of claim 17, wherein the liquid contains isopropanol.

19. The method of claim 14, comprising
embedding the at least one optical waveguide into the protective layer before the surrounding the protective layer with the sheath,
subsequently curing the protective layer by heating the protective layer.

20. The method of claim 14, comprising
arranging spherical elements on the sheath before the applying the conductive layer,
subsequently applying the conductive layer to the sheath and the spherical elements.

21. The method of claim 20, comprising curing the sheath by heating the sheath.

22. The method of claim 21, wherein the applying the conductive layer is effected as long as the sheath is in a heated state owing to the curing the sheath, after applying the conductive layer, drying out the conductive layer.

\* \* \* \* \*